United States Patent [19]
Ames

[11] 3,954,328
[45] May 4, 1976

[54] EXTENSIBLE REAR VIEW MIRROR

[76] Inventor: Marc L. Ames, 99 Coventry Circle, Piscataway, N.J. 08854

[22] Filed: Dec. 19, 1974

[21] Appl. No.: 534,643

[52] U.S. Cl. .............................. 350/304; 248/478; 248/480
[51] Int. Cl.² ........................................ G02B 5/08
[58] Field of Search .................. 350/299, 303, 304; 248/477–481

[56] References Cited
UNITED STATES PATENTS

| | | | |
|---|---|---|---|
| 1,969,415 | 8/1934 | Ostroff | 350/304 |
| 2,168,003 | 8/1939 | Stone | 350/304 X |
| 2,663,225 | 12/1953 | Blan | 350/304 |
| 3,048,084 | 8/1962 | Iannuzzi | 350/304 |

*Primary Examiner*—John K. Corbin
*Assistant Examiner*—F. L. Evans
*Attorney, Agent, or Firm*—Silverman and Jackson

[57] ABSTRACT

A rear view mirror having a slidably extensible auxiliary reflective element is disclosed. The auxiliary reflective element serves to enlarge the range of rear view vision of the driver of a vehicle such as an automobile. The position of the auxiliary mirror can easily be adjusted with regard to both its displacement from the principal mirror and the relative angle of its plane with regard to the plane of the principal mirror.

3 Claims, 5 Drawing Figures

U.S. Patent May 4, 1976 Sheet 1 of 2 3,954,328
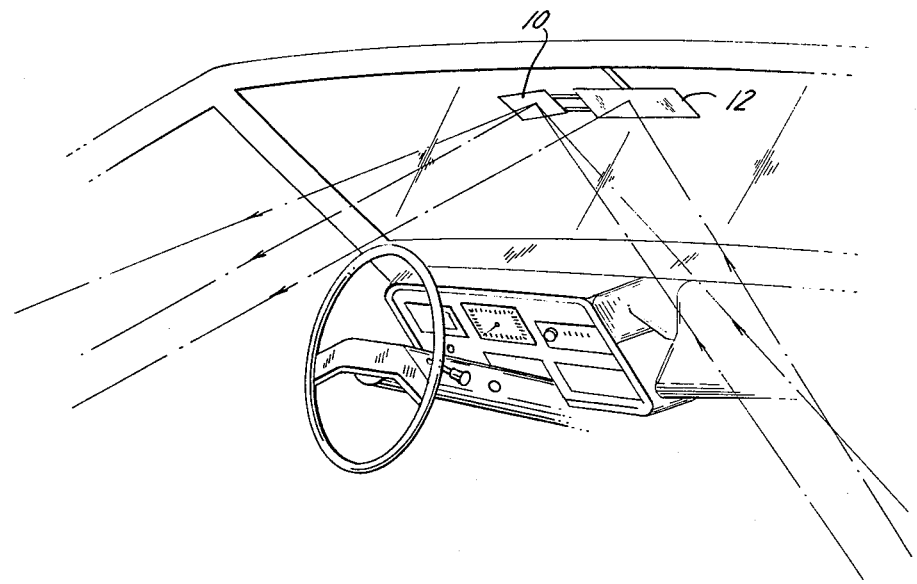
FIG.1
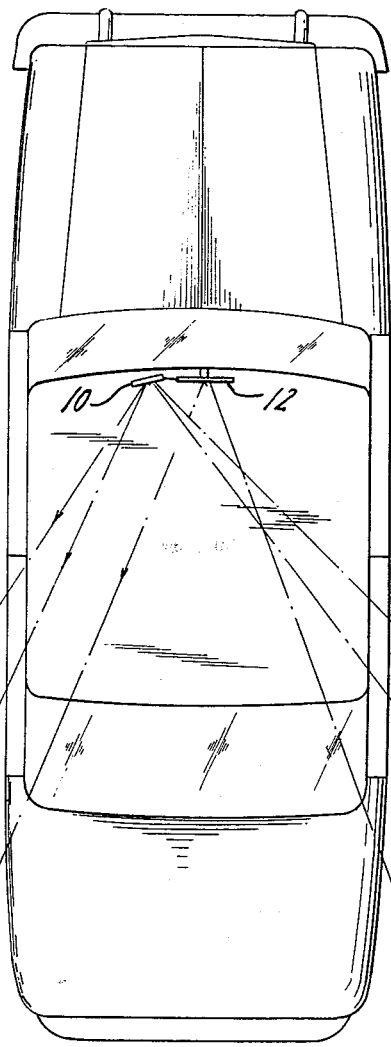
FIG.4
FIG.2
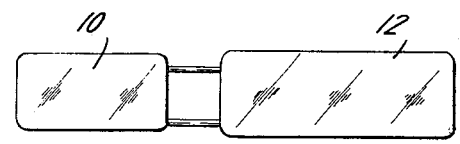
FIG.3

EXTENSIBLE REAR VIEW MIRROR

BACKGROUND OF THE INVENTION

The present invention relates to an improvement in rearview vision mirrors and, more particularly, to a mirror permitting the driver of an automobile to obtain a wide range of rear-view vision.

With the advent of high speed driving, especially on multi-lane highways, the need for improved driver visibility has become pronounced. For example, it is not uncommon for collisions to occur where a car moves out of the lane it previously was in and moves into the path of a faster moving car, coming along its right side. Accordingly, a quick and reliable means for ascertaining whether the path on the right of a car is clear is quite desirable.

The inventor believes that this phase of auto safety has been overlooked to a substantial degree, not withstanding the rapid advances made in providing safety features on modern automobiles.

To a certain extent, a solution to this safety problem has been aproximated by the placing of additional mirror surfaces in and about the car. These expedients all suffer from the drawback of requiring additional time to utilize them in order to provide information about the surroundings of the automobile while necessitating multi-person (or multi-function) adjustment of the outside mirror.

The problem of "blind spot" vision is particularly critical at high speeds where time is of the essence and any deviation of the driver's view from his path might well result in an accident. This is especially true with reflecting surfaces that are provided in and about a car that are not directly attached to the main rear-view mirror.

With regard to those prior art approaches that have suggested the use of a curved mirror, it is noteworthy that the use of such mirrors result in distortions of depth and size perception. In addition, there is created a parallex distortion which affects the driver's perception of the relative lateral distances which objects, in such a mirror, appear to be from each other.

Accordingly, it is seen that a need has existed for an improved means for rear-view observation in an automobile.

SUMMARY OF THE INVENTION

It is an object of the present invention to provide an auxiliary surface to an otherwise conventional rear-view mirror, thereby providing the driver with an improved range of rearview vision.

Another object is to provide a new type of reflecting surface, especially suited for automobiles, which overcomes the problems and disadvantages of the prior art as set forth in the Background of the Invention.

Another object is to provide a viewing mirror for automobiles that provides substantially complete information about the character of the surroundings at the rear right region of an automobile.

Still another object is to provide a viewing mirror that effectively permits receipt of information from the rear and side of the driver that is not ordinarily visible to the driver without the turning of his head.

Yet another object is to provide a mirror of the above type that presents information about the auto's surroundings in a form in which distortion of size and distance is minimized.

Other objects and advantages of this invention will become evident from the hereinafter set forth specification and claims.

BRIEF DESCRIPTION OF THE DRAWINGS

FIG. 1 is an interior perspective view illustrating the various lines of sight available to a driver utilizing the present invention.

FIG. 2 is a front perspective view of a principal mirror in association with an extensible rear-view mirror.

FIG. 3 is a partial breakaway rear perspective view of one embodiment of the extensible rear-view mirror in operative association with the principal mirror.

FIG. 4 is a top schematic view of the view of FIG. 1.

DETAILED DESCRIPTION OF THE INVENTION

Figure 5:
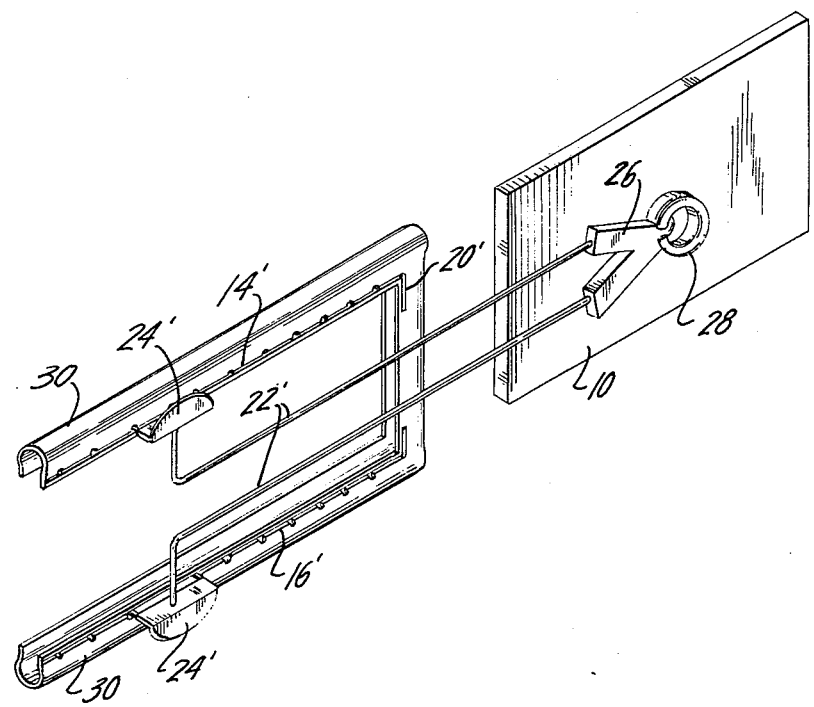
FIG. 5 is a perspective view of a second embodiment of the present invention.

In FIG. 4 is denoted an area at the rear right of the automobile as BLIND AREA. It is observations within this area that present the greatest auto safety problem. In general, light from this area cannot reach the eye of the driver.

In order to remedy this problem, the present invention provides for the addition of a small extensible mirror 10 to a principal mirror 12. Through the provision of appropriate means for linear and angular displacement (hereinafter described) of the extensible mirror 10 relative to the principal mirror 12, a significant increase in the viewable area available to the driver can be obtained.

Turning now to FIG. 3, there is illustrated the various elements which serve to interconnect the extensible mirror to the principal mirror. It is seen that the back of the principal mirror 12 is provided with a pair of upper and lower tracks 14 and 16 which are themselves provided with a plurality of notches 18. Said notches serve as linear displacement control means for the extensible mirror 10. Also, the tracks 14 and 16 are, at the right end thereof, provided with a pair of stops 20 which serve to limit the right-hand movement of the extensible mirror relative to the principal mirror.

In FIG. 3, one observes that the linear movement of the extensible mirror with relationship to the principal mirror is controllable through a pair of spring-depressible members 22 and their associated finger grips 24. In order to effectuate a movement of the extensible mirror 10 relative to the principal mirror 12, the finger grips 24 are simply depressed by the driver, and then advanced, either to the left or right, along the notched tracks 14 and 16. The notches 18 serve as control means by which discrete increments of linear movement can be obtained. The sring-depressible members 22 serve to bias the finger grips outwardly against the notched track, thus securedly holding the extensible mirror with respect to the notched tracks.

It is seen that the spring-depressible members 22 extend into a connecting member 26 which in turn is joined to a universal joint 28. The function of the universal joint 28 is to permit an angular movement of the extensible mirror 10 with respect to the plane of the principle mirror 12. By virtue of the universal joint 28, a driver may adjust the extensible mirror 10 in order to change the area, at the right rear of the auto, which he can observe. Thus, through the above-described configuration, an auto driver can adjust both the linear and angular position of the extensible mirror relative to the principal mirror. Through such a bi-modal adjustment capability, a simple and economical means of viewing rearward areas surrounding an automobile, not heretofore obtainable with equal ease and economy, is obtained.

Shown in FIG. 5 is a second embodiment of the present invention in which the tracks 14 and 16, with their associated elements are integrated into a U-shaped slide 30 which is adapted for slidable securement about the edges of the principal mirror 12. In all other respects the function of the embodiment of FIG. 5 corresponds to that of the embodiment of FIG. 3, with respectively corresponding reference numerals being denoted by prime superscripts.

It is thus seen that the object of obtaining an improved means for rear-view observation in an automotive vehicle has been efficiently attained by the above-described embodiment of the present invention.

While there have been hereinshown and described a preferred embodiment of the present invention, it will be understood that the invention may be embodied otherwise than is herein specifically illustrated or described and that within said embodiment certain changes in the detail and construction, and in the form and arrangement of the parts may be made without the parting from the underlying idea or principles of the invention within the scope of the appended claims.

Having thus described my invention what I claim as new, useful and non-obvious and, accordingly, secure by Letters Patent of the United States is:

1. A rear-view mirror system for vehicles comprising:
  a. A principal mirror;
  b. an extensible mirror, smaller in size than said principal mirror; and
  c. means for connecting said extensible mirror to said principal mirror so as to enable linear and angular movement of said extensible mirror relative to said principal mirror, said connecting means comprising a U-shaped slide element, said slide element adapted for slidable securement about the edges of said principal mirror, a pair of parallel directed tracks adhered to said U-shaped slide element, said tracks provided with a plurality of regularly spaced notches, said notches on one of said tracks provided in lateral opposition with respect to corresponding notches provided on the other of said tracks, a pair of spring-depressable members, each of said members having at one end thereof a pair of laterally opposed, oppositely directed finger grips adapted for incremental movement in relation to said notches, and a universal joint adhered to the back of said extensible mirror and having its movable element secured to both of the opposite ends of said spring-depressable members, whereby said slidable association of said spring-depressable members and said tracks enables said extensible mirror to move incrementally in a linear direction relative to said principal mirror, while said universal joint provides said extensible mirror with angular movement capacity relative to said principal mirror.

2. The mirror system of claim 1 wherein said tracks are provided with stops at the ends thereof closest to said extensible mirror.

3. The mirror system of claim 1 wherein the plane of said extensible mirror is normally provided at a slight angle relative to the plane of said principal mirror, said angle being defined in a direction forward from said principal mirror toward the driver of the vehicle.

* * * * *